June 18, 1968   J. N. SIMPSON ET AL   3,388,405
SUSPENSION FOR SAFETY HEADGEAR
Filed June 8, 1966   2 Sheets-Sheet 2

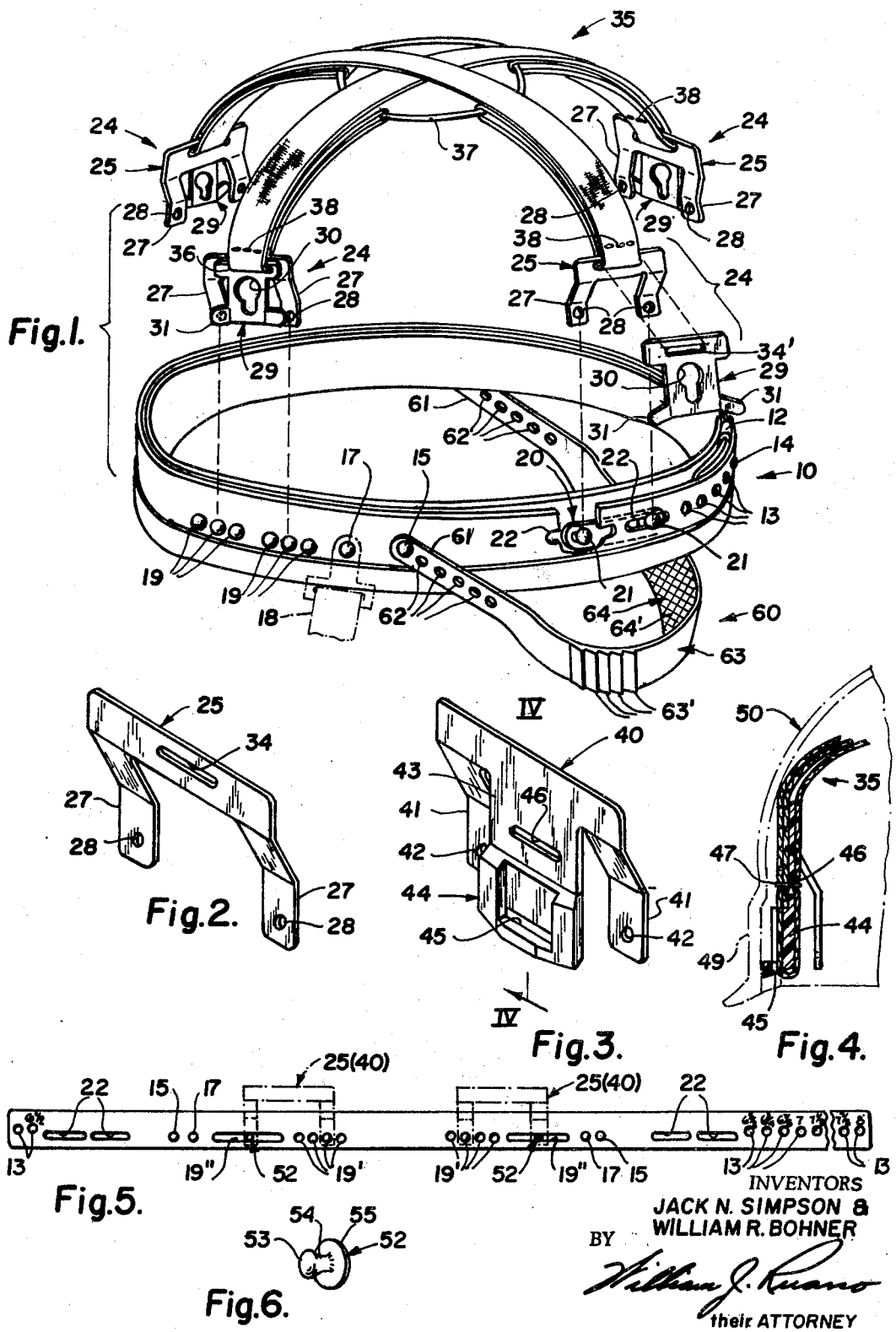

INVENTORS.
JACK N. SIMPSON &
WILLIAM R. BOHNER
BY

*their* ATTORNEY 3,388,405
SUSPENSION FOR SAFETY HEADGEAR
Jack N. Simpson and William R. Bohner, Reading,
Pa., assignors to ESB Incorporated, a corporation
of Delaware
Continuation-in-part of application Ser. No. 438,491,
Mar. 10, 1965. This application June 8, 1966, Ser.
No. 556,067
4 Claims. (Cl. 2—3)

This invention relates, generally, to a suspension for safety headgear and, more particularly, to a four-point suspension for safety hats and caps for the protection of industrial workmen and others exposed to hazards of falling objects or the like.

This is a continuation-in-part of our application Ser. No. 438,491, filed Mar. 10, 1965.

An outstanding disadvantage of commonly used suspensions for safety hats and caps is the difficulty involved in making adjustment of the suspension to fit different head sizes of different wearers, also the insufficiency of the range of sizing adjustment.

Another disadvantage is the lack of suitable anchoring means to prevent the suspension from dropping off the wearer's head when he stoops or bends forwardly, such as to pick up an object from the floor.

Still another disadvantage is the complicated designs, making attachment and detachment difficult, and the resulting high manufacturing costs involved.

An object of the present invention is to provide a new and novel suspension for safety hats and caps, which suspension is devoid of the above-named disadvantages.

A more specific object of the present invention is to provide a hat suspension which is easily and quickly attachable and detachable as well as adjustable throughout a wider range than heretofore possible.

Another specific object of the invention is to provide a four-point suspension for a head strap assembly, wherein two of the points are adjustably fixed and the two remaining points are continuously adjustable throughout a multiplicity of positions of the headband.

Other objects and advantages will become more apparent from a study of the following description, taken with the accompanying drawing wherein:

FIG. 1 is a perspective, exploded view of a four-point suspension embodying the present invention for adjustably securing a headstrap assembly to a headband for supporting a safety hat or cap so as to protect the head of the workmen against blows from falling objects and the like;

FIG. 2 is an enlarged, perspective view of one of the fastening or hanger elements 25 shown in FIG. 1;

FIG. 3 is an enlarged, perspective view of a modification of the fastening or hanger element shown in FIGS. 1 and 2;

FIG. 4 is a vertical, cross-sectional view taken along line IV—IV of FIG. 3;

FIG. 5 is a plan view of the backing strip for the headband 10 when spread out into a form of a flat strip;

FIG. 6 is an enlarged, perspective view of one of the buttons 52 shown in FIG. 5.

Figure 7:
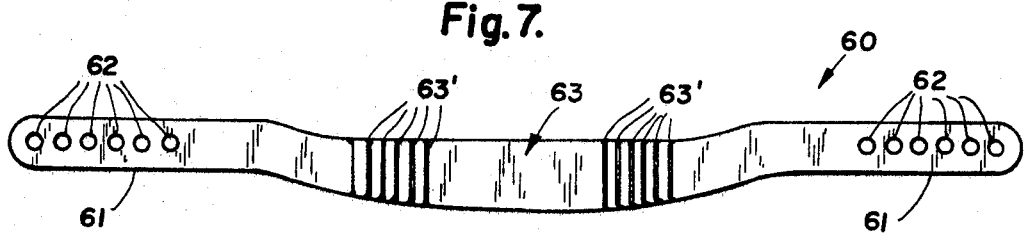
FIGS. 7, 8 and 9 are rear, front and top views, respectively, of the nape strap.

Referring more particularly to FIG. 1 of the drawing, numeral 10 generally denotes the headband comprising an exterior, flexible backing strip which may be of low density polyethylene or other suitable flexible material. To the bottom edge thereof is sewn and folded upwardly, an inner lining or sweatband of softer material having a spongy inner layer, both having perforations extending therein (not shown) to provide suitable ventilation.

As shown more clearly in FIG. 5, the backing strip, when extended out into a flat plane, will more clearly show a pair of horizontal slots 22 near the end portion, integrally molded buttons or headed studs 19' and holes 13, 15 and 17.

FIG. 6 shows one of the buttons 52, illustrated in FIG. 1, and preferably of hard plastic material, such as polyethylene, and comprising a base portion 55, a neck portion 54 and a head or bead portion 53. Buttons 19' and slots 19'' are for the purpose of detachably and adjustably securing clip or hanger elements 25, as shown in FIG. 2, or 40, as shown in FIG. 3, at selective positions along the length of the backing strip.

More specifically, FIG. 2 shows one of the clips 25, preferably of plastic material, such as polyethylene, and having a substantially inverted U-shape with a slot 34 in the base of the U and having laterally offset or bent arms 27, through the ends of which are formed holes 28.

As shown more clearly in FIG. 1, clips 25 are attached to selectively different positions on the backing strip by extending one of the pairs of buttons 19 through the holes 28. At the left of FIG. 1, the two vertical dash lines show the normal position for attachment, that is, to buttons 19 in the center of the two sets of three shown. The extreme left button pairs would be used for small head sizes and the extreme right button pairs would be used for large head sizes, it being understood that there is a similar set of buttons on the right front side which is the same as that show in the left front side, also that there is a similar slidable assembly on the right rear side as shown in the left rear side of FIG. 1. In short, the two clip assemblies 24, shown at the left of FIG. 1, are the front clip assemblies, whereas the two clip assemblies 25 shown to the right of FIG. 1 are the rear clips.

The headstrap assembly, generally denoted by numeral 35, comprises separate and independent cross-straps 36 of very flexible and strong fabric or plastic material having end portions which are looped back and around cord 37 and then sewn at 38 to form an intermediate small loop extending through slot 34 of clip 25. Cord 37 may be tied to form different diameter loops for different head sizes and is tied in a knot after forming the proper loop size.

Also extending through the small intermediate loops in the cross-strips, formed by sewing at 38, are metal (or springy plastic) clips generally denoted by numeral 29 comprising a slot 34' through which the loop extends and comprising a key-hole slot 30 and two spring arms 31 to bear against the inner surface of safety hat or cap 50. There are four of such springs clips 29 shown, one in association with each of the plastic clips 25. The purpose of the key-hole slots is to engage correspondingly positioned headed studs formed on the inside surface of a safety hat or cap (not shown) for example, as illustrated in Simpson Patent No. 2,858,528, dated Nov. 4, 1958, assigned to the present assignee.

After the spring clip 29 has been fastened to the safety hat or cap, the associated plastic clips 25 are detachably secured to selective pairs of buttons 19 at the left and right front portions of the headband and are attached to buttons 21 at the left and right rear portions. Thus the front clips will remain fixed or stationary, after attachment to the selective buttons 19, to suit normal, large or small head sizes. After the backing strip end portions have been overlapped sufficiently to form the desired headband size, a collar button 14, attached to loop 12 sewn to the sweatband, is extended through one of the holes 13 at the terminal portion to fix the girth or circumference of the headband. Sizes from 6 to 8 are shown which can be even smaller or larger by provision of additional holes.

A strip of plastic or other suitable material sandwiched between the sweatband and backing strip 20 carries, near its extremities, integral buttons which project through a pair of slots 22, whereby the plastic clip assemblies 24 and the strips 20 may slide as complete units along the slots 22 to provide longitudinal adjustment along the circumference of the headband for the rear clip assemblies 24. With such adjustments, the head strap assembly 35 will make a proper fit on a wide variety of head sizes and will form a very comfortable fit by having the clips adjustable at all four points of attachment to the headband.

FIGS. 3 and 4 show a modification of the clip assemblies 24 shown in FIGS. 1 and 2. Instead of employing metal clips, such as 29 in FIG. 1, and plastic clips, such as 25 of FIG. 2, a single unitary plastic clip or hanger 40 is provided at the four suspension points, the construction of which is more clearly shown in FIGS. 3 and 4. The all-plastic, integral clip 40, preferably of hard plastic material, such as nylon, is of inverted U-shape with offset legs 41 having holes 42 but with an integral plastic depending wedge portion 44 whose top part 43 has a slot 46 through which the head strap is passed and then sewed by stitching 47, after first forming a loop which passes through a lower slot 45. The wedge shaped side portions of part 44 are adapted to engage a correspondingly wedge-shaped slot formed in the inside surface of the band portion 49 of a safety hat or cap, denoted by numeral 50 in FIG. 4, Johnson et al. Patent 2,585,937 dated Feb. 19, 1952, assigned to the present assignee, shows such wedged connection in more detail.

FIGS. 3 and 4 show modified clips or hangers 40 which may be substituted for the plastic (25) and metal (29) clip assemblies 24 shown in FIG. 1 and accomplish the same purpose as these assemblies in that they serve as connectors for adjustable and detachable connection to the headband and to the hat or cap with lateral spacing therebetween, as afforded by the offset portions of the legs of the inverted U-shaped clip portions.

Figure 8:
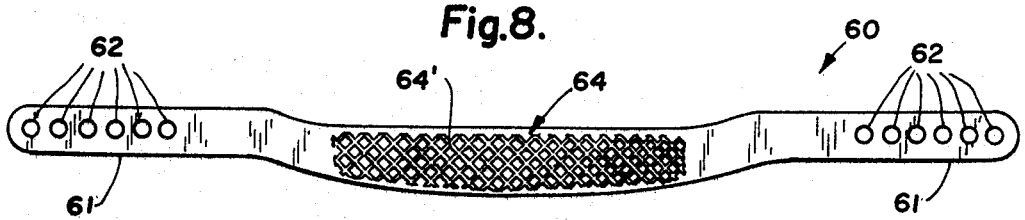
Figure 9:
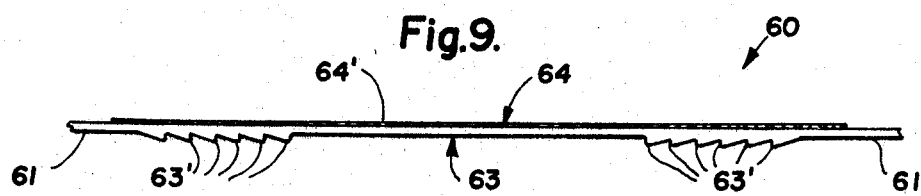

As shown in dot and dash outline in FIG. 1, the adjustable chin strap 18 may be employed with its terminal clip attached to a button in hole 17. In order to prevent the headband from dropping off the head when the wearer bends forwardly, a nape strap 60 comprising a single flexible strip, such as of the same plastic material, is detachably secured at its end portions 61 to the backing strip. The two end portions of the nape strap 60 are attached to diametrically opposite portions of the headband and have a plurality of holes 62, whereby a button emerging from the hole 15 in the headband may be inserted through selective holes to adjustably shorten or lengthen the effective length of the nape strap. The inner surface 64 thereof engages the back of the lower portion of the head and may have waffle shaped ridges 64' (see FIGS. 7, 8, 9) or other friction surface to form a non-slip fit. The central portion 63 of the strap is arcuate and provided on the opposite surface with serrations 63'.

Thus it will be seen that we have provided an efficient, four-point headband suspension for a safety hat or cap, although it should be noted that an additional cross-strap may be used to make a six-point if desired, all points of which are adjustably and detachably secured to different positions along the length of the head strap to form fixed front points of attachment and slidable rear portions of attachment; furthermore, we have provided a novel clip construction for making it possible to easily and quickly attach the headband suspension to both the hat or cap and the headband in an adjustable manner so as to give a wide variety of adjustment, so that different persons having different head sizes may wear the same suspension; and we have provided a novel nape strap for anchoring the suspension to the head of the wearer.

While we have illustrated and described several embodiments of our invention, it will be understood that these are by way of illustration only, and that various changes and modifications may be made within the contemplation of our invention and within the scope of the following claims.

We claim:

1. In a headband suspension for safety hats and caps comprising two separate cross-straps having loops, a clip of substantially inverted U-shape at the end of each cross strap, each clip having a slot in the center through which said loop extends, a fastening element depending from said slot and supported by said loop, the legs of said clips being offset laterally with respect to the main portion of said clip and terminating in holes, a headband having a plurality of groups of collar button-like projections for different head sizes, selected ones of said button-like projections extending through said holes to selectively fasten said headband to said clip.

2. A suspension as recited in claim 1, wherein said fastening element is in the form of a spring clip having a key-hole slot and having spring-like wing portions extending outwardly from the bottom thereof.

3. A suspension as recited in claim 1 wherein said fastening element is integrally formed as part of said clip and includes a male fastening wedge in the bottom portion containing a slot in its bottom through which said cross strap is passed and said loop begins, whereby the entire height of said fastening element is encircled and reinforced by said cross strap, and an additional slot centrally of said fastening element through which said cross strap and loop are sewn together, and means for tying the ends of said loops together.

4. In a crown strap suspension for safety headgear including a headband, a nape strap of flexible material having a plurality of spaced holes in each end portion for selective attachment to two diametrically oppositely disposed collar button-like projections from said headband so as to adjust the effective suspended length of the nape strap to fit different head sizes of the wearer, said end portions of the nape strap forming an obtuse angle with the central portion, said central portion provided throughout substantially its entire area with a friction surface of waffle-shaped ridges to provide lines of frictional contact and a non-slip fit with the nape of the neck of the wearer so as to be held securely thereby.

References Cited
UNITED STATES PATENTS

| | | | |
|---|---|---|---|
| 1,207,137 | 12/1916 | Clore | 2—181.8 |
| 2,769,176 | 11/1956 | Grancsay et al. | 2—3 |
| 2,814,043 | 11/1957 | Alesi | 2—3 |
| 3,008,145 | 11/1961 | Austin et al. | 2—3 |
| 3,041,621 | 7/1962 | Brockway | 2—3 |
| 3,175,225 | 3/1965 | Lindblom | 2—3 |
| 3,192,536 | 7/1965 | Benner | 2—3 |
| 2,946,063 | 7/1960 | Boyer | 2—3 |
| 2,218,590 | 10/1940 | Szumkow | 2—181.8 |

JORDAN FRANKLIN, *Primary Examiner.*

PATRICK D. LAWSON, JAMES R. BOLER,
*Examiners.*